United States Patent [19]

Osujo et al.

[11] 4,016,957

[45] Apr. 12, 1977

[54] BALL-RAMP CAM ACTUATED DISK BRAKE

[75] Inventors: Masahide Osujo; Seiiti Ikegami; Yoshinobu Murayama; Takaho Omura; Tadashi Morimoto, all of Sakai, Japan

[73] Assignee: Kubota Tekko Co., Ltd., Osaka, Japan

[22] Filed: Sept. 30, 1975

[21] Appl. No.: 618,154

[30] Foreign Application Priority Data

| Aug. 20, 1974 | Japan | 49-95784 |
| Oct. 24, 1974 | Japan | 49-129730 |
| Nov. 22, 1974 | Japan | 49-134718 |

[52] U.S. Cl. .............................. 188/72.7; 192/93 A
[51] Int. Cl.² ........................................ F16D 55/31
[58] Field of Search .............. 188/71.1, 72.2, 72.7, 188/18 A; 192/70.23, 93 A; 74/710.5

[56] References Cited

UNITED STATES PATENTS

| 2,014,348 | 9/1935 | Woodward | 188/18 A |
| 2,262,708 | 10/1941 | Lambert | 188/72.2 |
| 3,049,364 | 8/1962 | Clay | 188/72.7 X |
| 3,382,952 | 5/1968 | Grattapaglia | 188/72.7 X |
| 3,651,897 | 3/1972 | Hahn | 188/72.2 |
| 3,734,242 | 5/1973 | Klaue | 188/72.7 X |

FOREIGN PATENTS OR APPLICATIONS

| 200,945 | 12/1958 | Austria | 188/72.7 |

Primary Examiner—George E. A. Halvosa
Attorney, Agent, or Firm—Armstrong, Nikaido & Marmelstein

[57] ABSTRACT

Disk brake apparatus mounted on a differential gear shaft extending from each side wall of a transmission case. A cam plate and balls coact to press a brake disk mounted on the differential gear shaft against a friction surface. Each of the balls is in direct or indirect point-to-point contact with the outer side wall of the transmission case to reduce the sliding resistance involved.

4 Claims, 8 Drawing Figures

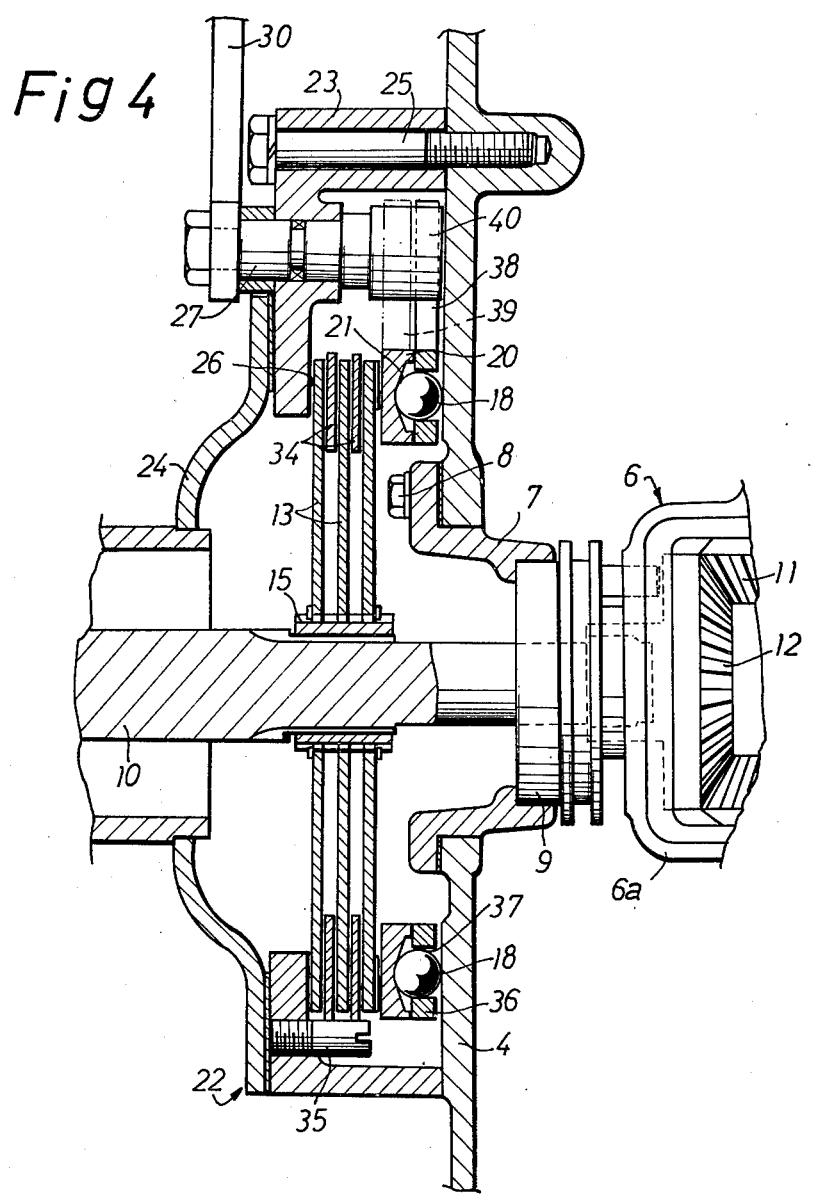
Fig 4
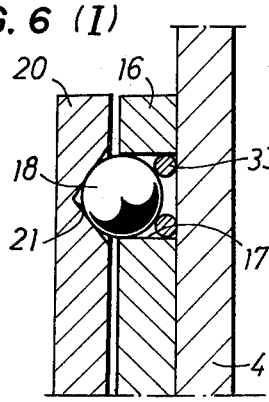
FIG. 6 (I)
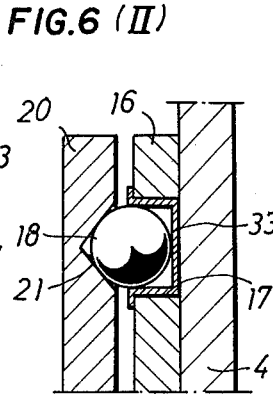
FIG. 6 (II)
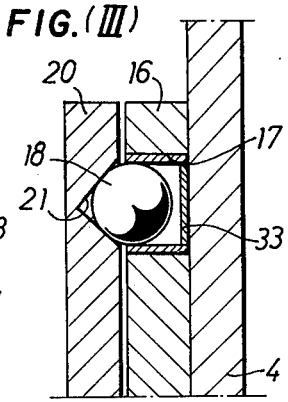
FIG. (III)

BALL-RAMP CAM ACTUATED DISK BRAKE

BACKGROUND OF THE INVENTION

The present invention relates to a brake apparatus for braking the drive wheel of tractors and like vehicles, and more particularly to a disk brake apparatus in which a cam plate presses a brake disk against a friction surface.

Generally employed as brake apparatus for braking drive wheels of tractors and like vehicles are disk brake apparatus mounted on the side walls of the transmission case. The disk brake apparatus includes a brake disk which is mounted on the differential gear shaft of the differential unit housed in the transmission case and which is adapted to be pressed against a friction plate. More specifically stated, the apparatus further includes a movable cam plate and a stationary ball retaining plate formed with cam grooves to hold balls therebetween. The movable cam plate, when turned by a brake cam, produces a thrust in the axial direction of the differential gear shaft to thereby press the brake disk against the friction plate. With such construction in which the balls are interposed, as retained in the cam grooves, between the movable cam plate and the stationary retaining plate, the balls which are in contact with the semispherical surfaces defining the cam grooves of the retaining plate are subjected to very high sliding resistance which hinders a smooth operation. Moreover, the large amount of turning movement of the movable cam plate required makes it difficult to ensure a quick operation. Accordingly another type of construction has been proposed which includes a movable ball retaining plate and a movable cam plate, such that both the plates are made turnable in opposite directions to each other to reduce the amount of movement needed. However, since the ball retaining plate is in pressing contact with the side wall of the transmission case, the retaining plate encounters high friction resistance when turned. It is therefore still difficult to assure a quick operation.

SUMMARY OF THE INVENTION

An object of this invention is to provide a disk brake apparatus in which the balls interposed between a movable cam plate and a ball retaining plate are held in direct or indirect point-to-point contact with the side wall of the transmission case so as to greatly relieve the ball of sliding resistance and to thereby assure a very smooth operation.

Another object of this invention is to provide a disk brake apparatus in which the balls are effectively held in point-to-point contact with the transmission case by the differential bearing case serving as the ball retaining member and which therefore is composed of a reduced number of parts, is easy to assemble and operates with improved accuracy.

Another object of this invention is to provide a disk brake apparatus comprising a movable cam plate and a ball retaining plate which are turnable in opposite directions to each other to reduce the amount of turning movement and to ensure a quick braking operation.

Still another object of this invention is to provide a disk brake apparatus in which the balls are held in point-to-point contact with the transmission case without permitting the balls to produce any dent in the transmission case.

BRIEF DESCRIPTION OF THE DRAWINGS

FIG. 4 is a side elevation in vertical section showing another embodiment of the present invention;

FIG. 6 (I) to (III) are sectional views showing several examples of seat member placed in a ball holding portion.

DESCRIPTION OF THE PREFERRED EMBODIMENTS

Figure 1:
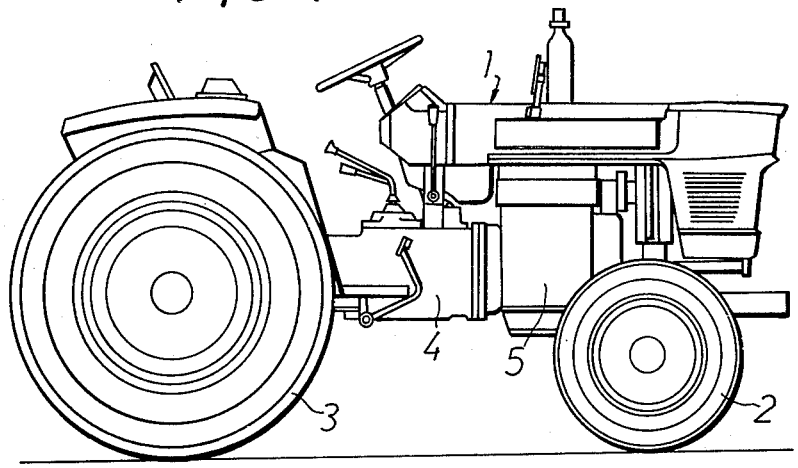
FIG. 1 is a side elevation showing the entire appearance of a tractor.
Figure 2:
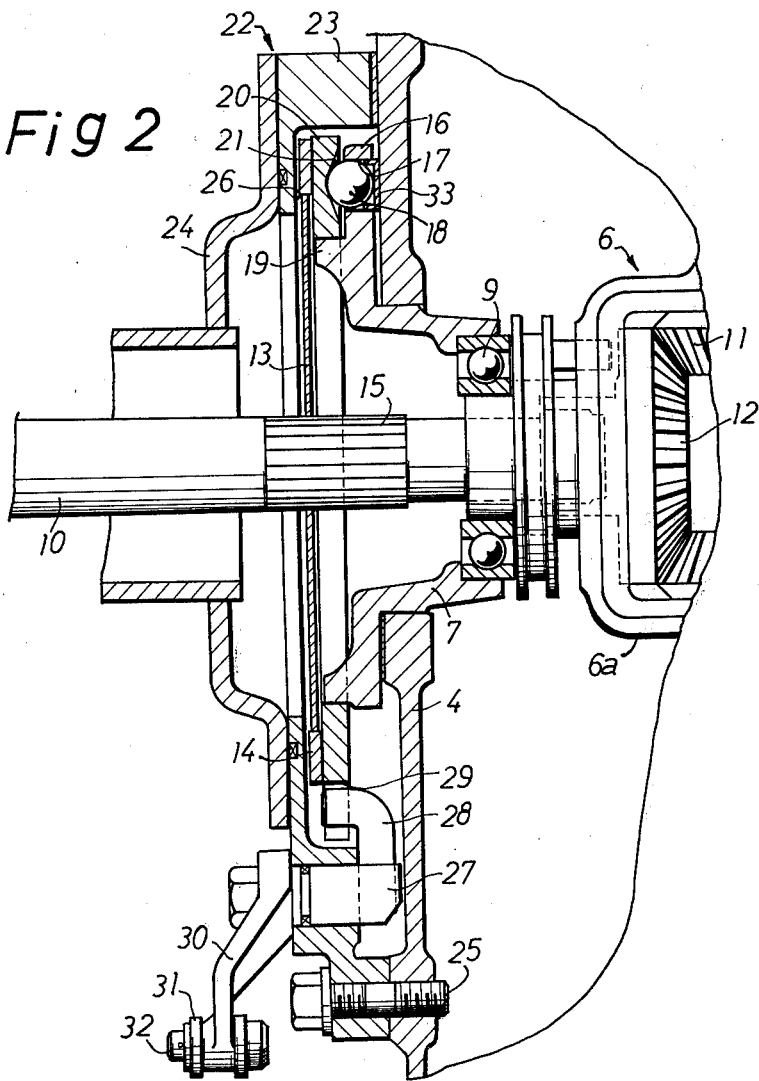
FIG. 2 is a side elevation in vertical section showing the internal construction of a brake apparatus according to this invention.
Figure 3:
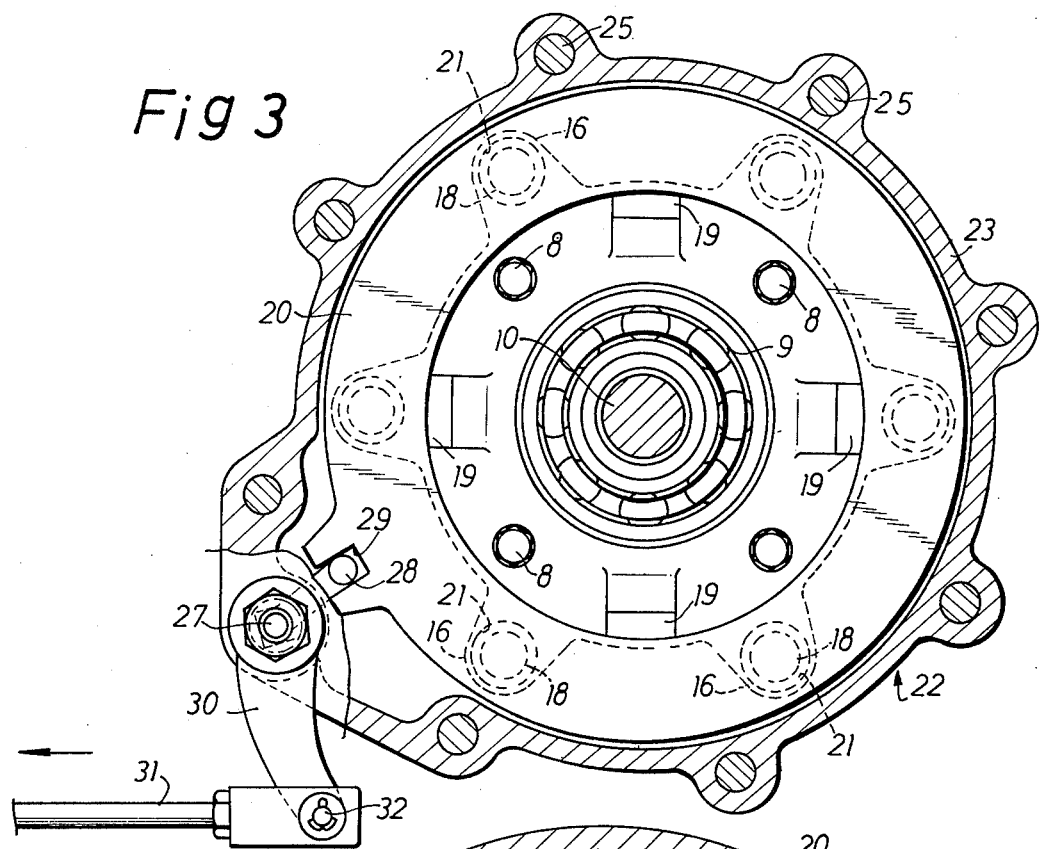
FIG. 3 is a front view in vertical section of the brake apparatus of FIG. 2.

With reference to FIGS. 1 to 3, a tractor body 1 is provided with a pair of front wheels 2 serving as steering wheels and a pair of rear wheels 3 serving as drive wheels. A transmission case 4 constitutes the frame of the tractor. An engine 5 is disposed to the front of the case 4.

The transmission case 4 houses speed change means such as a primary speed change unit and a secondary speed change unit and further accommodates a differential unit 6 in its rear portion. A pair of differential bearing cases 7 are secured by bolts 8 to the opposite outer side walls of the transmission case 4 respectively. The bearing case 7 is fitted with a radial ball bearing 9 which rotatably supports a differential case 6a. A pair of differential gear shafts 10 extend outward from the opposite sides of the differential unit 6. The inner end of each of the differential gear shafts 10 has a differential side gear 12 meshing with a differential pinion 11. The differential gear shaft 10 is supported at its outer end by a terminal speed reduction case and is coupled to the rear wheel axle by way of terminal speed reduction means housed in that case.

A brake disk 13 has linings 14 on the outer peripheral, opposite side surfaces thereof and engages at its inner periphery with a spline 15 formed in the differential gear shaft 10. The brake disk 13 is therefore rotatable with the differential gear shaft 10 and slidable axially of the shaft 10 and is positioned outside the differential bearing case 7. Ball retaining projections 16 projecting from the outer periphery of flange of the differential bearing case 7 are arranged circumferentially at a specified spacing as seen in FIG. 3. The projections 16 are positioned substantially on the outer side wall of the transmission case 4 and are each formed with a bore 17 for rollably receiving a ball 18 therein.

Cam supporting portions 19 projecting from the outer side surface of the differential bearing case 7 are arranged circumferentially at a predetermined spacing (see FIG. 3). The outer peripheral surfaces of the support portions 19 are substantially in coincidence with a cylindrical plane concentrical with the differential gear shaft 10. An annular cam plate 20 is rotatably and axially movably fitted around the cam support portions 19 and has conical cam grooves 21 in its surface facing the balls 18. A brake housing 22 comprises a main frame 23 and a cover 24. The main frame 23 is fixed to the transmission case 4 by bolts 25 and has an inner surface 26 substantially serving as a friction surface.

Accordingly the brake disk 13 is interposed between and opposed to the friction surface 26 and the cam plate 20.

A brake cam shaft 27 is supported by the main frame 23 rotatably about a horizontal pin and has an inner end to which a brake cam 28 in the form of an L-shaped round bar is fixed. The brake cam 28 is in engagement with a groove 29 formed in the outer periphery of the cam plate 20.

Fixed to the outer end of the cam shaft 27 is a cam lever 30 to which is pivoted one end of a brake rod 31 by a pin 32. The other end of the brake rod 31 is attached to an unillustrated brake pedal or the like.

The brake apparatus illustrated in FIGS. 2 and 3 operates as follows. The brake pedal, when depressed, moves the brake rod 31 in the direction of the arrow in FIG. 3, turning the brake cam 28 in a clockwise direction in FIG. 3 through the brake cam lever 30 and brake cam shaft 27.

Because the brake cam 28 is in engagement with the groove 29 of the cam plate 20 fitted around the support portions 19, the movement of the brake cam 28 turns the cam plate 20 about its center as supported by the portions 19, permitting the balls 18 to roll within the conical cam grooves 21 in the cam plate 20, with the result that the cam grooves 21 and balls 18 coact to produce an axial outward thrust which presses the brake disk 13 against the friction surface 26. The resulting friction brakes the rotation of the differential gear shaft 10. During this operation, the balls 18 received in the bores 17 in the projections 16 are in point-to-point contact with the outer side wall of the transmission case 4, so that the balls 18 encounter low sliding resistance.

The construction in which the flange of the differential bearing case 7 is formed with the bores 17 for receiving the balls 18 eliminates the necessity of providing a separate ball retaining plate conventionally employed. Consequently the apparatus of this invention cam be composed of a reduced number of parts and is easy to make. Because the balls are held by the stationary bearing case 7 without any relative movement between the side wall of the transmission case 4 and the balls, the case 4 needs to be reinforced only at the points where it is in contact with the balls 18. This renders the transmission case very easy to make. Moreover, the cam plate 20 which is supported by the support portions 19 integral with the differential bearing case 7 is accurately movable free of chattering.

When the balls 18 are pressed against the side wall of the transmission case 4 in point-to-point contact therewith by the axial outward thrust, the balls may possibly produce dents in the side wall. During repeated use, the dents may further enlarge, producing irregularities in the amount of the play of the brake, leading to the necessity to replace the transmission case. To avoid the direct contact of the balls 18 with the transmission case 4, therefore, a seat member 33 is provided in the ball receiving bore 17 according to this invention.

The seat member 33 is made of a material such as Teflon or metal which has abrasion resistance and suitable hardness. The seat member 33 can be variously shaped. For example it is in an annular form as shown in FIG. 6(I), or in the form of a hat as shown in FIG. 6(II), or in the form of a channel in section composed of divided segments as seen in FIG. 6 (III), or in a dishlike form as shown in FIG. 2. When such seat member is used, the ball 18 can be held still in point-to-point contact with the seat member 33, whereas the seat member 33 is in face-to-face contact with the side wall of the transmission case 4, whereby the dents to be otherwise produced can be precluded.

Figure 5:
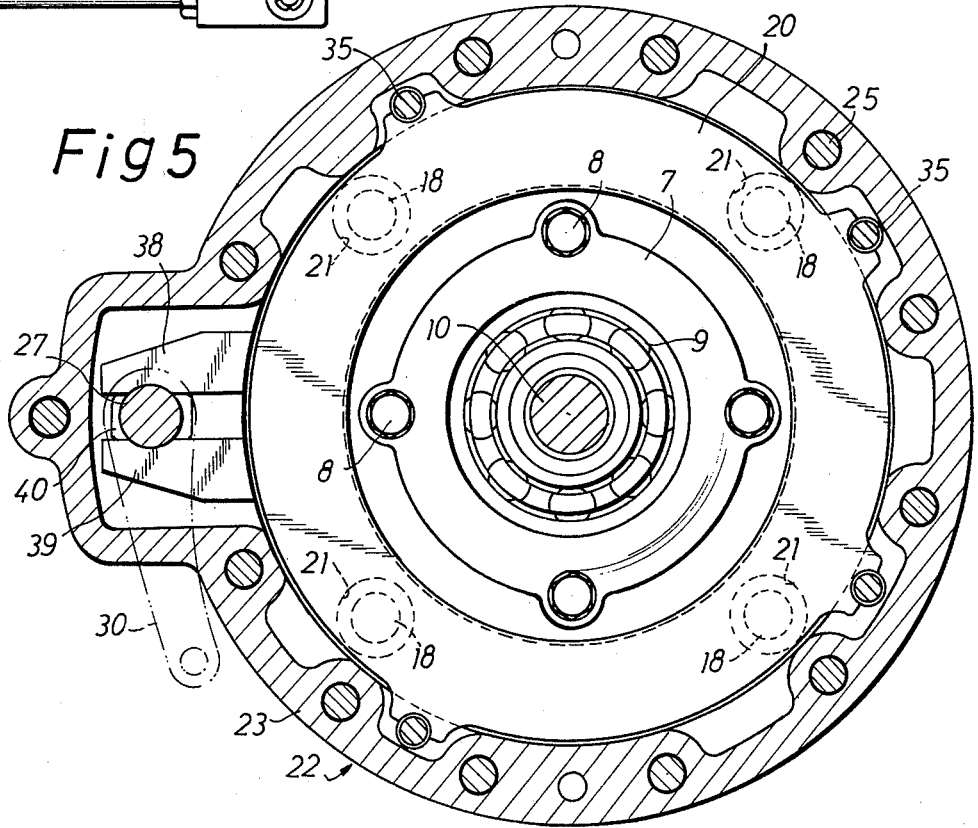
FIG. 5 is a front view in vertical section of the embodiment of FIG. 4.

FIGS. 4 and 5 show an embodiment of the multiple brake disk type including means for imparting a thrust to the brake disk more quickly and effectively.

A plurality of brake disks 13' and annular distance plates 34 are arranged alternately and spaced apart. The distance plates 34 are engaged by a plurality of pins 35 arranged circumferentially thereof and projecting into the interior of a main frame 23.

A cam plate 20 is supported at its outer periphery by the inner peripheral surface of the main frame 23 and is formed with a plurality of conical cam grooves 21 equidistantly arranged in the circumferential direction. Balls 18 are received in the cam grooves 21 and interposed between the cam plate 20 and the transmission case 4 in point-to-point contact with the case 4.

A ball retaining plate 36 for holding the balls 18 is annular like the cam plate 20 and is supported at its outer periphery by the inner peripheral surface of the main frame 23. The ball retaining plate 36 has a thickness smaller than the distance between the cam plate 20 and the outer side wall of the transmission case 4. The plate 36 is formed with bores 37 for receiving the balls 18 therein.

As seen in FIG. 5, the cam plate 20 and the ball retaining plate 36 have projections 38 and 39 respectively. Each of the projections projects from the outer periphery of the plate in the centrifugal direction. Provided between the projections 38 and 39 is a brake cam 40 for turning the cam plate 20 and the ball retaining plate 36 in opposite directions to each other. The brake cam 40 is fixed to the inner end of a cam shaft 27.

Thus with embodiment shown in FIGS. 4 and 5, the balls received in the cam grooves 21 are interposed between the cam plate 20 and the stationary outer side wall of the transmission case 4 and held in the bores 37 of the retaining plate 36 which is interposed between the cam plate 20 and the stationary outer side wall and which has a smaller thickness than the distance between the plate 20 and the side wall. When the cam plate 20 and the ball retaining plate 36 are turned in opposite directions to each other, a thrust is given to the cam plate 21. Consequently, the ball 18, always in point-to-point contact with the stationary wall, are smoothly movable with reduced sliding resistance or friction resistance. Because the cam plate 20 and the ball retaining plate 36 are turned in directions opposite to each other, the amount of turning movement needed is smaller. This ensures quick and exceedingly accurate operation.

What is claimed is:

1. A disk brake apparatus for use in a tractor or the like comprising a brake disk mounted on each of a pair of differential gear shafts extending through differential bearing cases fixed to the opposite side walls of a transmission case respectively to rotatably support a differential case, a brake housing mounted on each of the opposite side walls of the transmission case and having a friction surface outside the brake disk and in facing relation thereto, and thrust producing means disposed in the housing to press the brake disk against the friction surface, the thrust producing means comprising a cam plate formed with cam grooves facing a wall of said transmission casing arranged circumferentially thereof at a specified spacing, a ball received in each cam groove respectively, and a ball retaining plate having bores for retaining each said ball therein respectively, the balls being held in the bores in point-to-point contact with the side wall of the transmission case or a seat member placed in each of the bores of the ball retaining plate, the cam plate being movable in its circumferential direction to produce a thrust in the direction to press the brake disk against the friction surface through the cooperation of the balls and the cam grooves.

2. A disk brake apparatus as defined in claim 1 wherein the ball retaining plate has a thickness smaller than the distance between the cam plate and the outer side wall of the transmission case serving as a stationary wall, and the ball retaining plate and the cam plate are movable in opposite directions to each other circumferentially thereof.

3. A disk brake apparatus as defined in claim 1 wherein the ball retaining plate is substantially fixed to the outer side wall of the transmission case.

4. A disk brake apparatus as defined in claim 1 wherein the differential bearing case is formed at its outer peripheral flange with projections projecting radially outward and each having the bore for retaining the ball therein, and the differential bearing case is integrally formed with support portions for supporting the inner periphery of the cam plate.

* * * * *